(12) United States Patent  
Christopoulos et al.

(10) Patent No.: US 7,987,639 B2  
(45) Date of Patent: Aug. 2, 2011

(54) FORK CONFIGURATION DAMPERS AND METHOD OF USING SAME

(75) Inventors: Constantin Christopoulos, Toronto (CA); Michael Montgomery, Edmonton (CA); Tibor Kokai, Toronto (CA); Sean Smith, Etobicoke (CA); Agha Hasan, Milton (CA); Evan Bentz, Toronto (CA); Michael Collins, Oakville (CA)

(73) Assignees: The Governing Council of the University of Toronto, Toronto (CA); Constantin Christopoulos, Toronto (CA)

( * ) Notice: Subject to any disclaimer, the term of this patent is extended or adjusted under 35 U.S.C. 154(b) by 0 days.

(21) Appl. No.: 12/091,506

(22) PCT Filed: Jun. 16, 2006

(86) PCT No.: PCT/CA2006/000985  
§ 371 (c)(1),  
(2), (4) Date: Apr. 25, 2008

(87) PCT Pub. No.: WO2007/048217  
PCT Pub. Date: May 3, 2007

(65) Prior Publication Data  
US 2008/0307722 A1 Dec. 18, 2008

(30) Foreign Application Priority Data  
Oct. 26, 2005 (CA) .................................. 2524547

(51) Int. Cl.  
*E04H 9/02* (2006.01)

(52) U.S. Cl. ........................... 52/167.3; 52/573.1

(58) Field of Classification Search ...... 52/167.1–167.9, 52/393, 573.1  
See application file for complete search history.

(56) References Cited

U.S. PATENT DOCUMENTS

| 4,499,694 | A | * | 2/1985 | Buckle et al. | 52/167.7 |
| 4,761,925 | A | * | 8/1988 | Fukahori et al. | 52/167.7 |
| 5,271,197 | A | * | 12/1993 | Uno et al. | 52/167.1 |
| 5,491,944 | A | * | 2/1996 | Mors et al. | 52/295 |
| 5,842,312 | A | * | 12/1998 | Krumme et al. | 52/167.1 |
| 5,946,866 | A | * | 9/1999 | Weglewski et al. | 52/167.1 |
| 6,141,919 | A | * | 11/2000 | Robinson | 52/167.7 |
| 6,457,284 | B1 | * | 10/2002 | Isoda | 52/167.1 |
| 6,840,017 | B1 | * | 1/2005 | Shimoda et al. | 52/167.1 |
| 7,076,926 | B2 | * | 7/2006 | Kasai et al. | 52/167.8 |
| 7,174,680 | B2 | * | 2/2007 | Smelser | 52/167.3 |
| 7,712,266 | B2 | * | 5/2010 | Sarkisian | 52/167.1 |
| 2008/0016794 | A1 | * | 1/2008 | Tremblay et al. | 52/167.4 |

FOREIGN PATENT DOCUMENTS

| JP | 5-133137 | | 5/1993 |
| JP | 09317808 | A * | 12/1997 |
| JP | 10-220062 | | 8/1998 |
| JP | 10266622 | A * | 10/1998 |
| JP | 11-343675 | | 12/1999 |
| JP | 2004-197402 | | 7/2004 |
| JP | 2004218207 | A * | 8/2004 |
| JP | 2005126894 | A * | 5/2005 |

* cited by examiner

*Primary Examiner* — Eileen Lillis  
*Assistant Examiner* — James Ference  
(74) *Attorney, Agent, or Firm* — McMillan LLP

(57) ABSTRACT

A new configuration damper, for interconnecting two elements of a structure that undergo relative movements and deformations, that increase the level of damping when the overall structure is subjected to a loading condition is disclosed. The new configuration damper aides in controlling displacements, velocities and accelerations under dynamic loading in structural systems.

16 Claims, 14 Drawing Sheets

FORK CONFIGURATION DAMPERS AND METHOD OF USING SAME

FIELD OF THE INVENTION

The present invention relates to the field of damping systems for buildings, bridges and other structures. In particular, it relates to a new configuration damper, for interconnecting two elements of a structure that undergo relative movements and deformations, that increases the level of damping when the overall structure is subjected to a loading condition. The new configuration damper aids in controlling displacements, forces, velocities and accelerations under dynamic loading in structural systems.

BACKGROUND OF THE INVENTION

Modern buildings, using typical construction components such as reinforced concrete shear walls, structural steel braced frames, structural steel or reinforced concrete moment frames or combinations thereof, have low inherent damping properties. Due to this low inherent damping, high-rise buildings, in particular, tend to be susceptible to excessive vibrations caused by dynamic loads. Excessive accelerations and torsional velocities can cause occupant discomfort, while excessive displacements can cause damage to non-structural and structural elements. For this reason it is advantageous to provide additional sources of damping to control these excessive vibrations and reduce the overall building response to dynamic loads.

Currently available systems for controlling displacements, forces, velocities and accelerations in such structures consist of passive systems such as supplemental dampers and vibration absorbers as well as active systems.

Passive supplemental dampers such as hysteretic, viscous and visco-elastic dampers are currently used in typical braced configurations and are activated under axial deformations. While this may be effective in adding damping to some structural configurations, where under this typical braced configuration the brace elements undergo significant axial deformations, they are less effective for other structural systems, such as high rise buildings where the primary mode of lateral deformation does not cause sufficient axial deformation in typical bracing elements to actuate such dampers. In order to increase the deformations to an extent sufficient to activate the dampers, special configurations using toggle bracers or scissor braces to amplify the displacements are used.

Vibration absorbers such as Tuned Mass Dampers (TMD) and Tuned Liquid Dampers (TLD) are also used to reduce the deflections, forces, velocities and accelerations of such structures. They typically consist of a mechanical vibrating system installed on the top floor of buildings in order to maximize their effectiveness. This has the disadvantage of using up some of the most valuable real estate within the building in addition to being expensive to design and to build. They also act in a limited frequency range.

Active systems require an external power source, an actuating force and extensive hardware and software control systems. As a result, they are expensive to design and implement, and are susceptible to power outages or failure of the control system.

SUMMARY OF THE INVENTION

It is an object of this invention to provide a new damping system for structures which overcomes at least one of the disadvantages of the existing systems. In particular, it is an object of the invention that the damping system provides additional damping to a structure.

The present invention provides, from one aspect, a damping system for installation between lateral load-resisting structures, such as walls, of buildings and the like, which comprises sets of interdigitating parallel plates. The first set is adapted to be attached at one end to one wall and to co-operate with the second set at its other end. The second set is similarly adapted for attachment to the second wall. Energy dissipating material is interposed between the members of the respective sets of plates. Suitable energy dissipating materials are known in the art and include materials with sufficient strength to withstand lateral deformation that occurs in the structure, without tearing or being otherwise permanently deformed, while having the ability to dissipate the energy absorbed from the lateral deformation. When the two walls move relative to one another, e.g. in high winds, in-plane relative deformation, in both orthogonal directions, of the walls are dampened by the activation of the energy dissipating material between the sets of plates as a consequence of the relative displacement of the plates with respect to each other.

Thus according to an aspect of the invention there is provided a damping system for use in a structure comprising a first set of one or more plates coupled by a coupling means to a second set of one or more plates; the first set of plates, said first set of plates having a first end suitable for engagement to a first lateral load-resistant structural element within the structure; a second set of plates, said second set of plates having a second end suitable for engagement to a second lateral load resisting structural element within said structure, said second load resisting structural element being located adjacent to said first load resisting structural element, and coupling means effective to couple the first set of plates to the second set of plates, the coupling means comprising an energy dissipating material.

Preferably, the two sets of plates comprise a plurality of substantially parallel, spaced-apart plates, the plates of the first set being interdigitated with the plates of the second set. Preferably also, the sets of plates are attached to the two opposite ends of two different lateral load-resisting elements (shear walls, steel braces or columns) located in the same plane at certain levels of the structure. Extension elements may be used at either or both ends of the damper to extend its length to accommodate the distance between lateral load-resisting elements.

According to another aspect of the invention there is provided a method of increasing the damping in a structure comprising the steps of installing between two adjacent lateral load resisting structural elements of a structure at least one damping system as described above.

According to another aspect of the invention there is provided a structure with increased damping containing at least one damping system as described above.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIG. 2E is a side view of a combination of an outer structural column coupled to an inner shear wall in a typical building with an embodiment of the disclosed invention present coupled between the column and the shear wall;

FIG. 3 is a series of views (orthogonal, fragmentary, plan and side elevation) of a configuration of the invention comprising four steel plates coupled to five steel plates and four layers of high damping material sandwiched there between;

DETAILED DESCRIPTION OF THE PREFERRED EMBODIMENTS

Figure 1A:
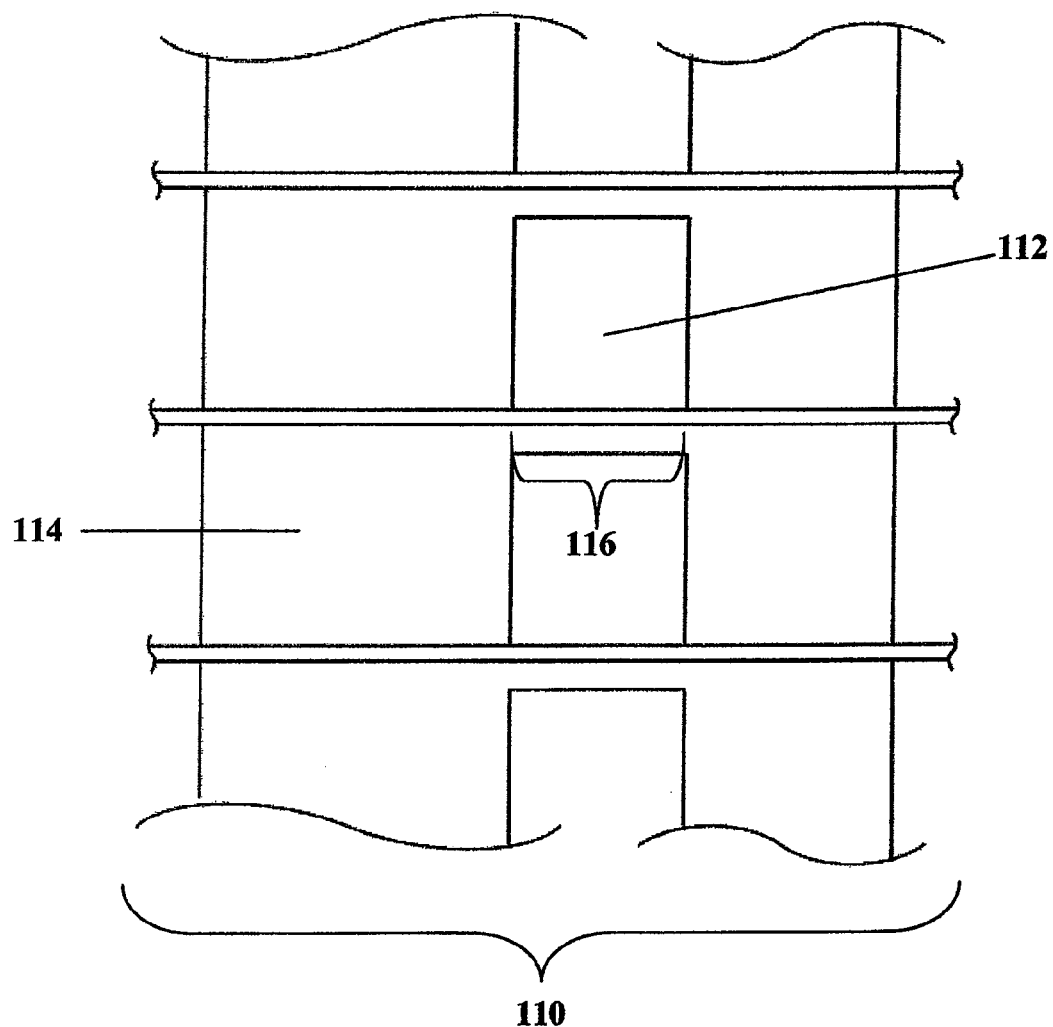
FIG. 1A is a side view of coupled shear wall in a typical building.
Figure 1B:
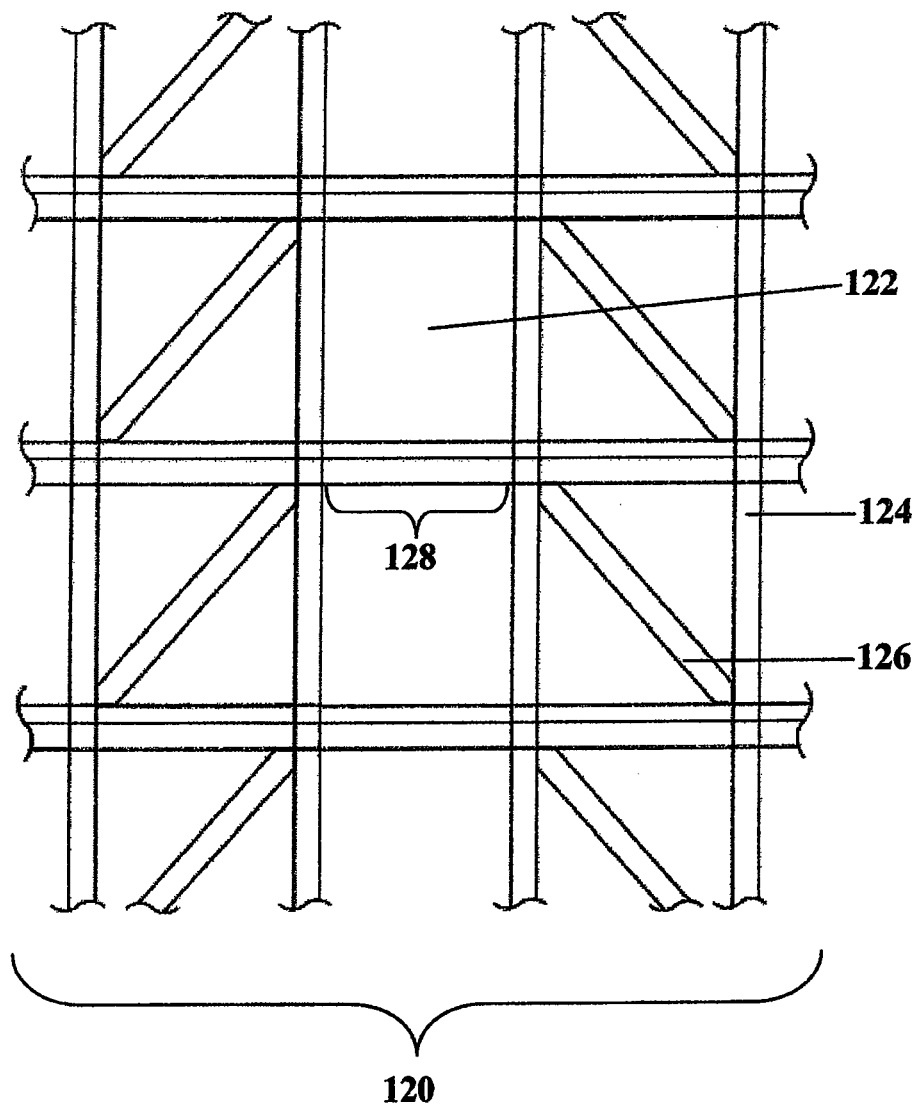
FIG. 1B is a side view of a structural steel braced frame in a typical building.
Figure 1C:
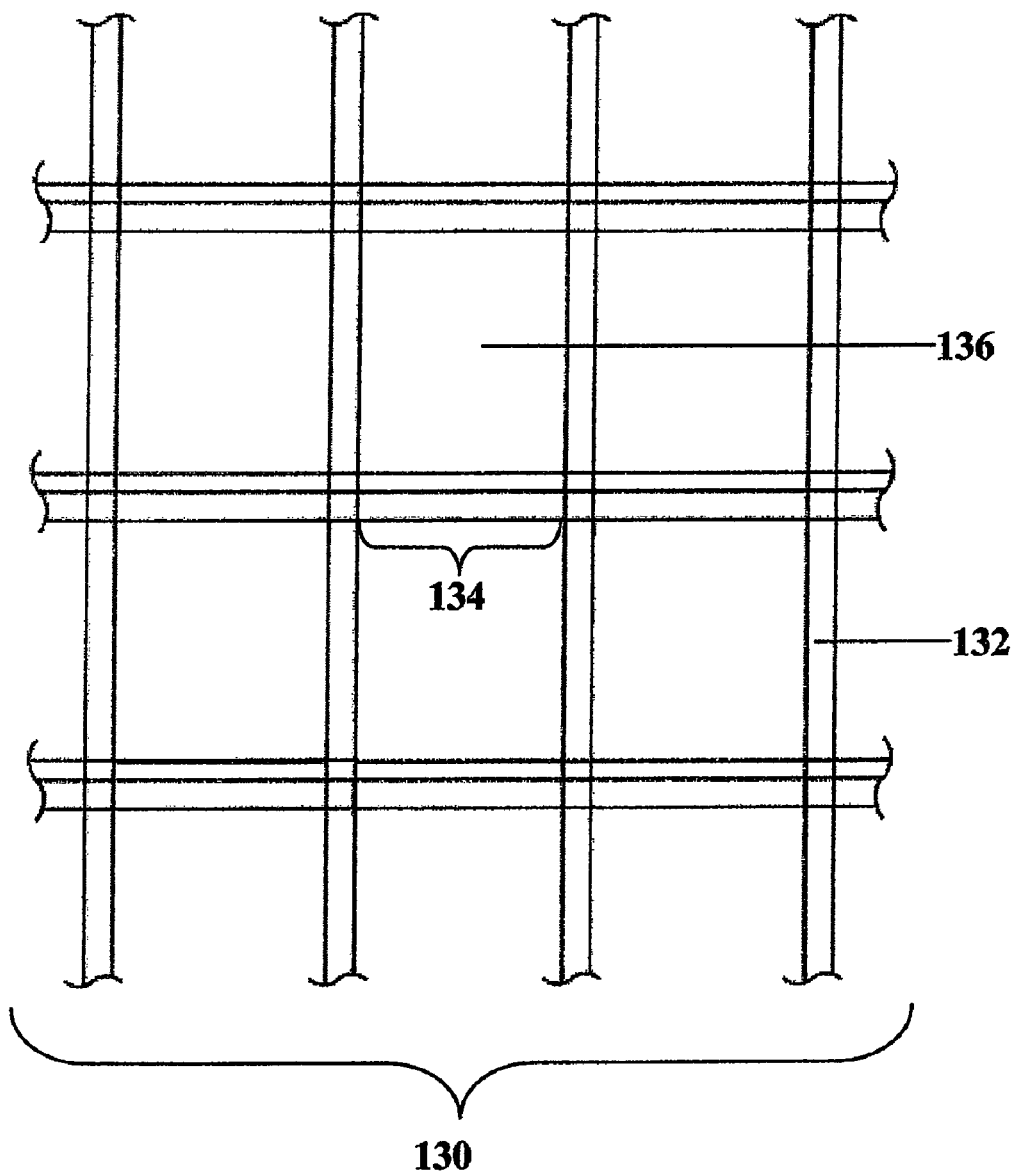
FIG. 1C is a side view of a structural steel or reinforced concrete moment frame in a typical building.
Figure 1D:
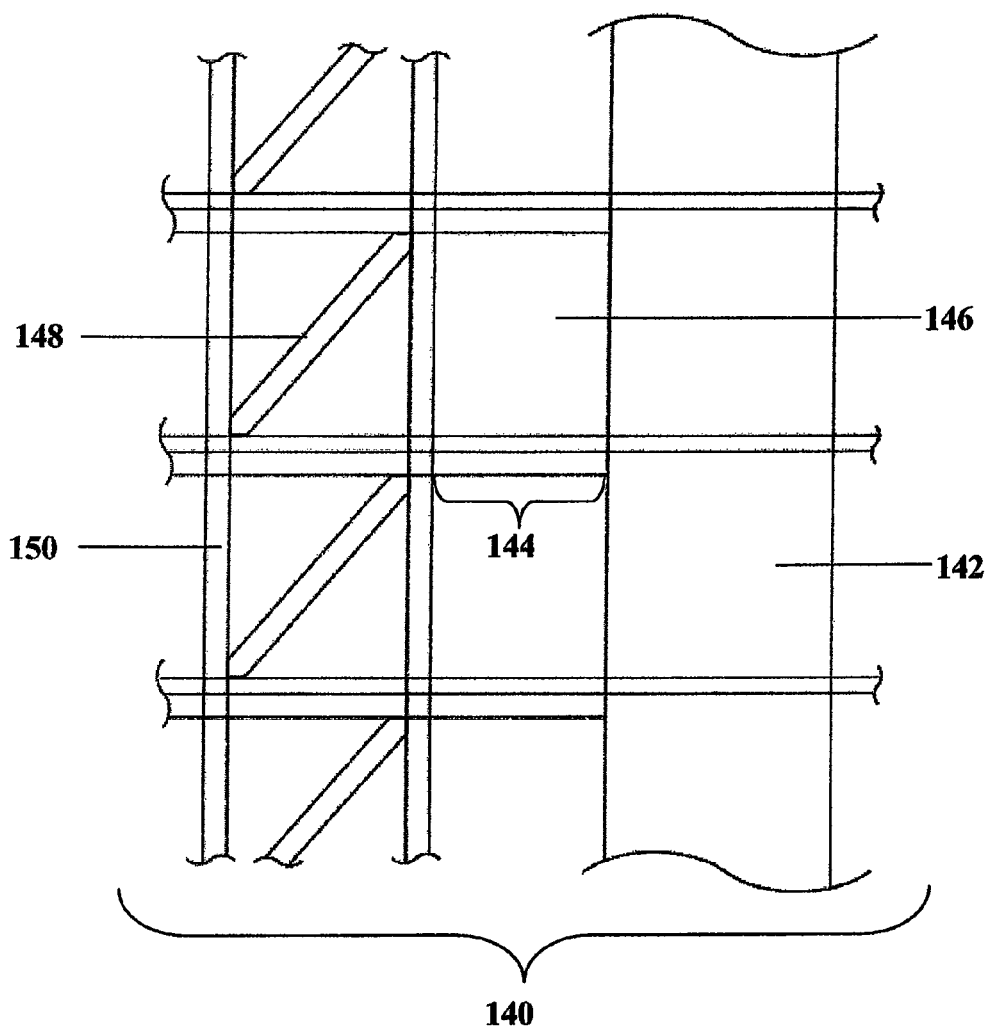
FIG. 1D is a side view of a combination of lateral load resisting systems, a structural steel braced frame and reinforced concrete shear wall in a typical building.
Figure 1E:
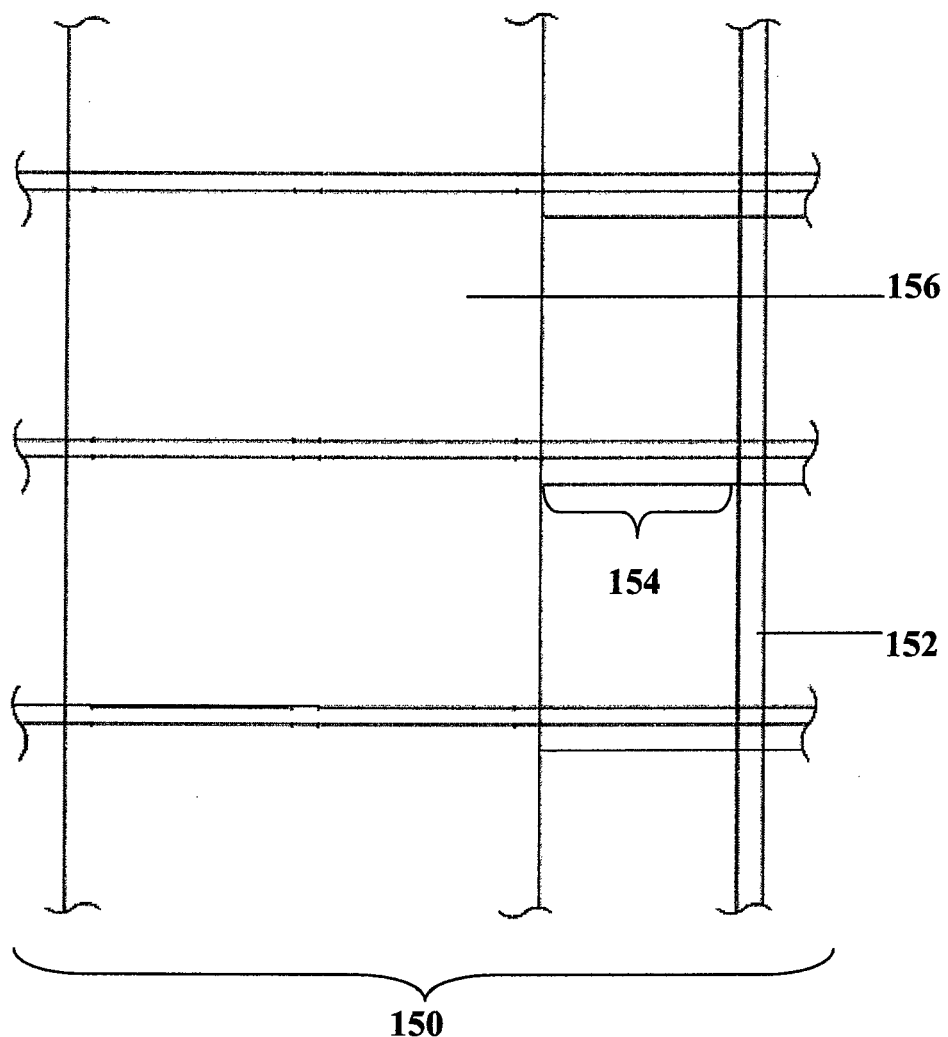
FIG. 1E is a side view of a combination of an outer structural column coupled to an inner shear wall in a typical building.
Figure 2A:
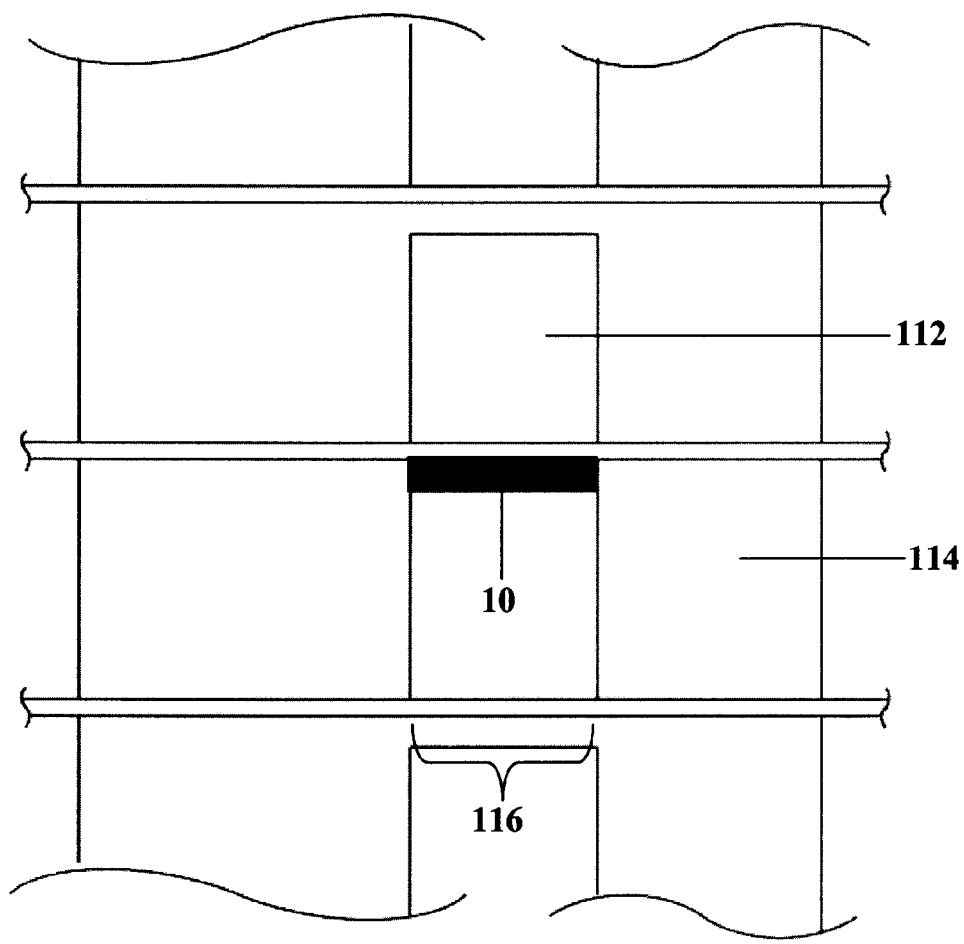
FIG. 2A is a side view of two shear walls in a high-rise building with the disclosed invention present coupled between walls.
Figure 2B:
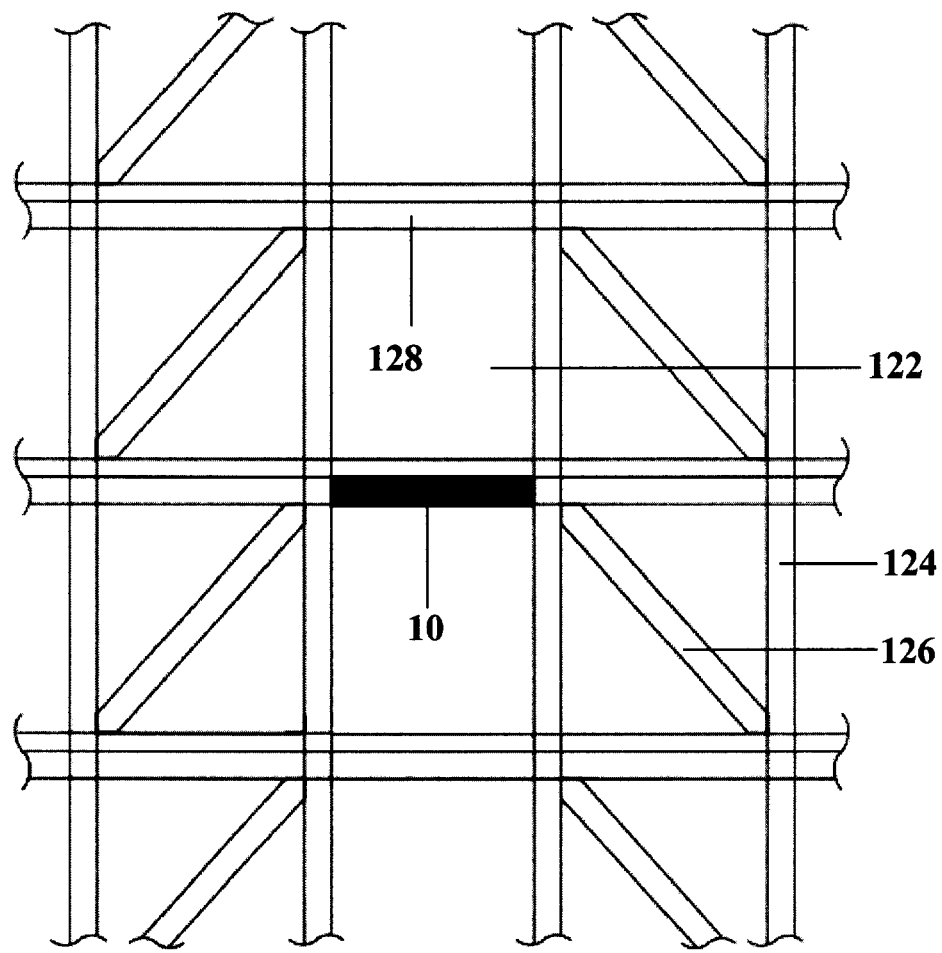
FIG. 2B is a side view of a structural steel braced frame in a high-rise building with the disclosed invention present coupled between braced frames.
Figure 2C:
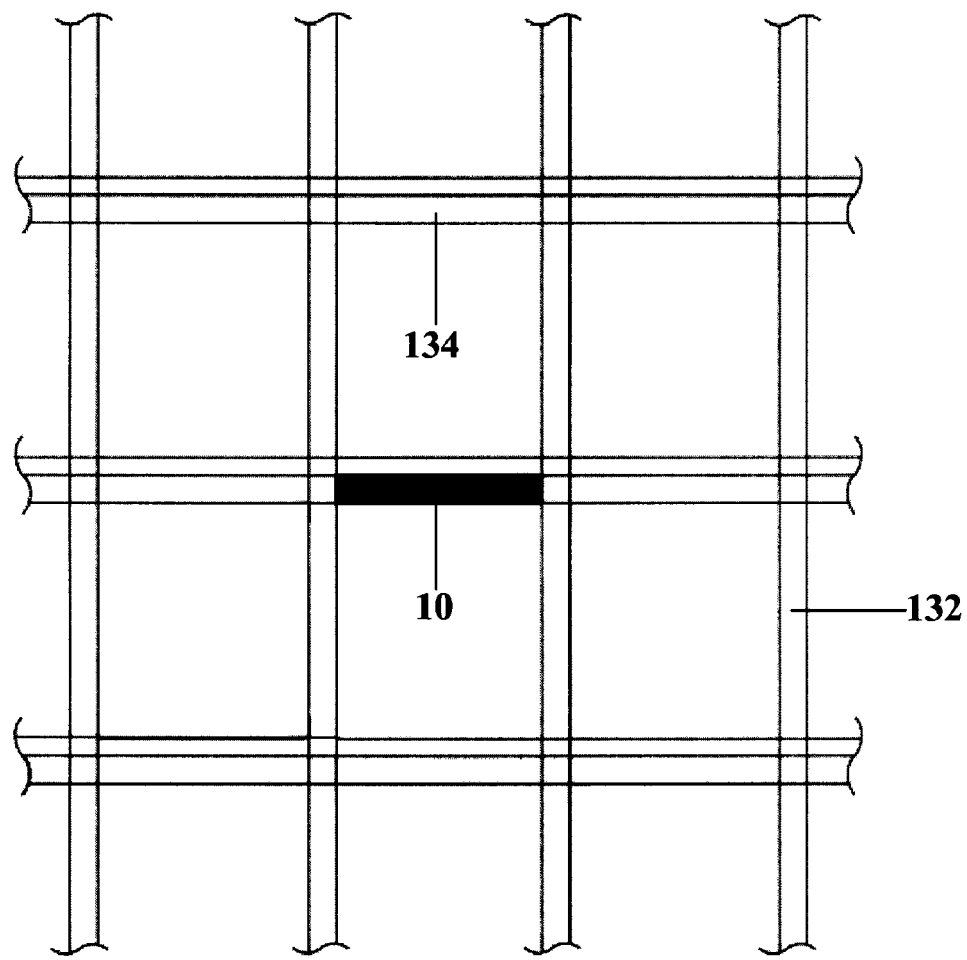
FIG. 2C is a side view of a structural steel or reinforced concrete moment frame in a high-rise building with an embodiment of the disclosed invention present coupled between moment resisting frames.
Figure 2D:
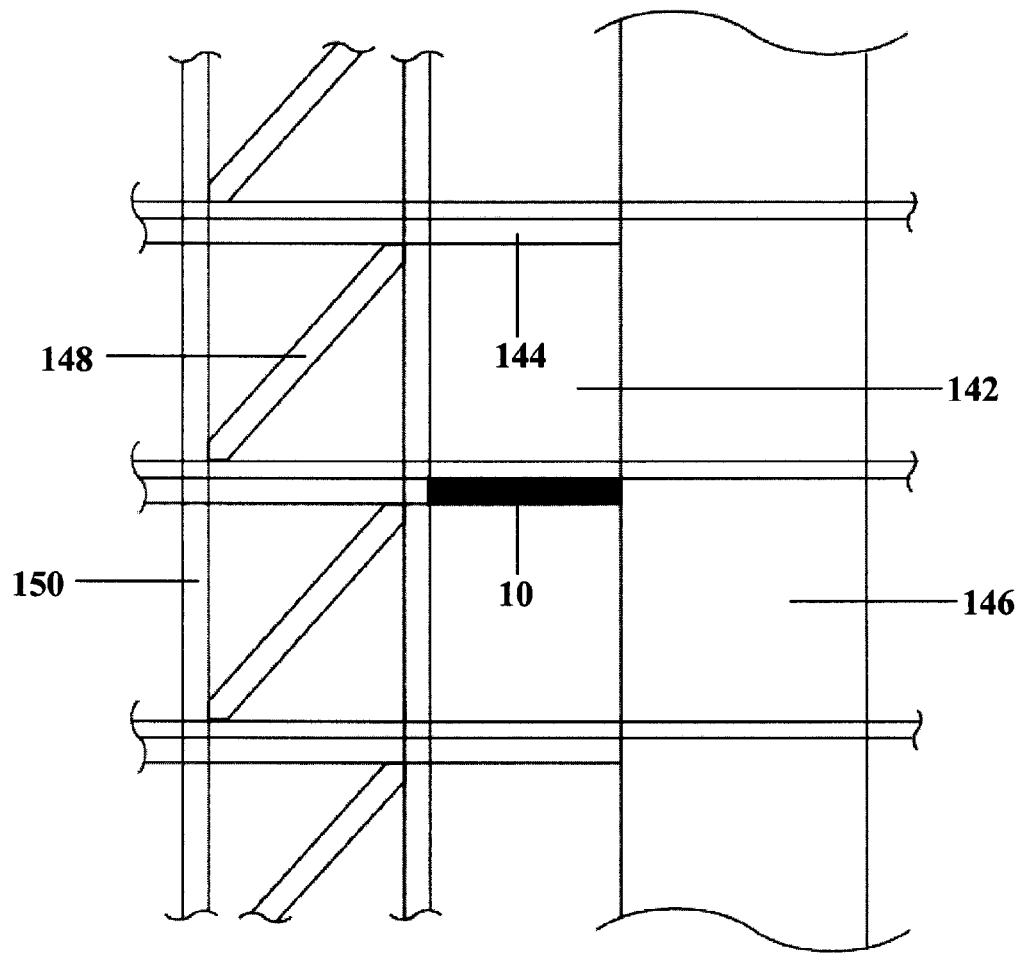
FIG. 2D is a side view of a combination of lateral load resisting systems, a structural steel braced frame coupled to a reinforced concrete shear wall in a highrise building with an embodiment of the disclosed invention present coupled between the steel brace frame and the concrete shear wall.
Figure 3D:
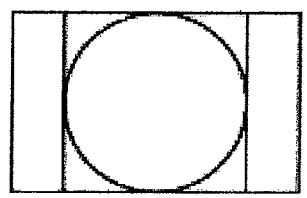
Figure 3D:
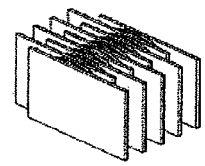
Figure 3D:
Figure 3D:
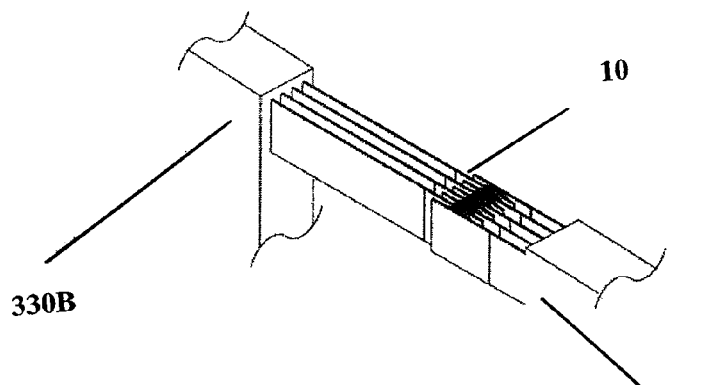

Referring now to FIGS. 1A-1E, examples of the present state of the art for the construction of mid and high-rise buildings is shown, namely using coupled reinforced concrete shear walls 114 (FIG. 1A), structural steel braced frames 120 (FIG. 1B), structural steel or reinforced concrete moment frames 130 (FIG. 1C), combinations thereof 140 (FIG. 1D), and construction with outer columns 152 (concrete or steel or any other material as used in the field of construction) and internal shear walls 156 (FIG. 1E). As a building is subject to wind or seismic loads, the coupling beams (116, 128, 134, 144, 154) or lateral braces (126, 148) are deformed, without providing any significant damping.

Referring to FIG. 1A, a structure 110 using reinforced concrete shear walls 114 has concrete coupling beams 116 located in the openings 112 between the shear walls 114. Similarly, a structure 120 using steel columns 124 and braces 126, as shown in FIG. 1B has steel coupling beams 128 located in the openings 122 between the columns 124. An alternative steel structure 130, consisting only of columns 132 and coupling beams 134 in the openings 136 is shown in FIG. 1C. The structure shown in FIG. 1D is a combination structure 140, with concrete shear walls 142 and steel columns 150 and braces 148 separated by an opening 146 and joined by coupling beams 144. The final structure 150 shown in FIG. 1E has external columns 152, preferably of concrete or steel, coupled to internal shear walls 156 by coupling beams 154.

In FIGS. 2A-2E, the damping system or damper of an embodiment of the invention, generally designated 10 described herein replaces one or more of the coupling beams (116, 128, 134, 144, 154) or lateral bracing elements (126, 148) of the structures shown in FIGS. 1A-1E. There is no loss in interior space by doing so, as the damper 10 merely replaces the coupling beams or lateral bracing and fits within the area otherwise occupied by the coupling beams or lateral bracing. However, for some applications a damper 10 of larger depth, up to the height of an entire story, can be used to replace the coupling beam, if required. In doing so, when the building is subject to dynamic wind or seismic loads, the damper 10 is deformed and provides supplemental damping to the system.

Figure 4A:
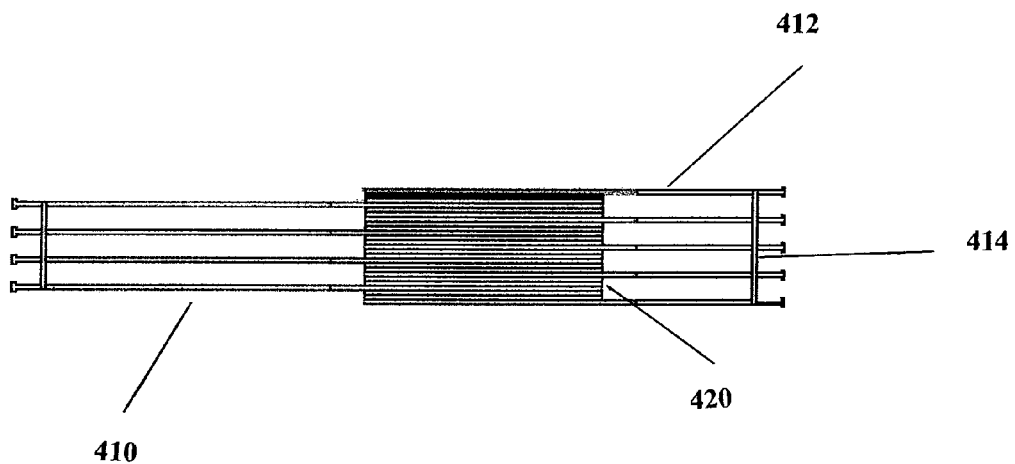
FIG. 4 is a pair of views (orthogonal and plan) of an alternative configuration of the energy dissipating material with a proposed anchor system and an example of the coupling zone configuration, with the damper coupled between two shear walls.
Figure 4B:
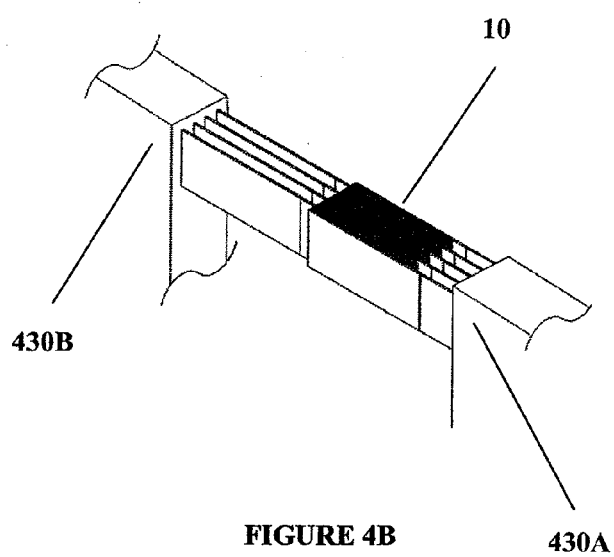
Figure 5A:
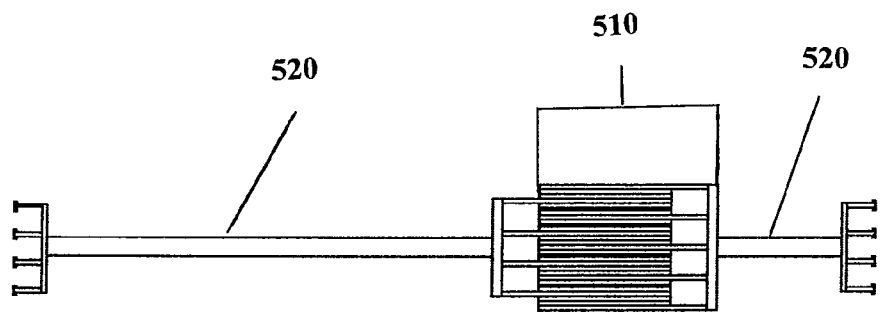
FIG. 5 is a pair of views (orthogonal and plan) an embodiment of the invention in which optional extension members are used to configure the damper system to be coupled between two shear walls.
Figure 5B:
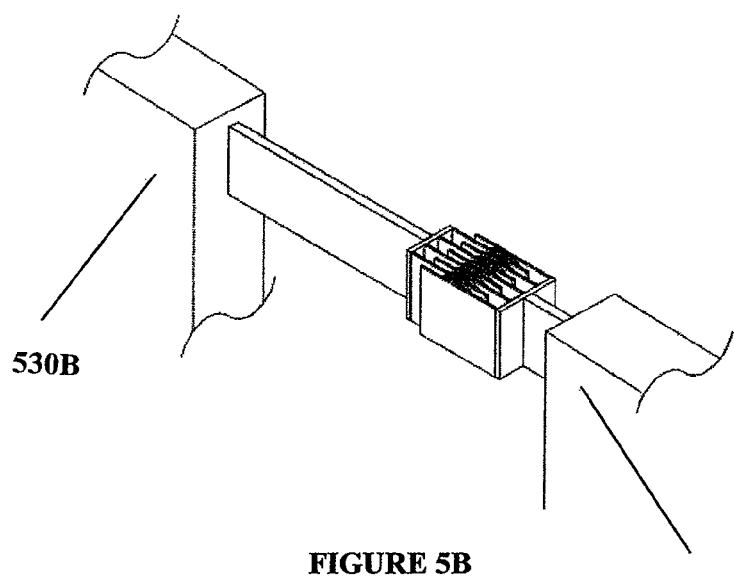

Referring variously to FIGS. 3-5, the damping system 10 is comprised of a first set of steel plates 310 interdigitated with a second set of one or more similar steel plates 312 and coupled thereto by way of interposed layers of energy dissipating material 320 firmly adhered thereto by layers of adhesive or other bonding means. The ends of the two sets of plates opposite the coupled ends are structurally engaged with a pair of adjacent lateral load resisting elements 330 i.e. concrete shear walls, by embedding the ends therein or by bolting the ends to the walls in secure fashion. The plates 310, 312 are sufficiently rigid to provide the necessary structural integrity to the building and to follow the movement of the first and second lateral load resisting structural elements 330A and 330B, thus accentuating the differential movement between the two ends of the lateral load resisting elements 330, which in turn shears the energy dissipating material 320 between the two sets of plates 310, 312. FIG. 3 discloses an example of a configuration of the damping system comprising four plates 310 connected to five plates 312. The four plates 310 are coupled to the five plates 312 by way of disks of energy dissipating material 320. There are eight layers of energy dissipating material 320 that undergo shear deformations when the lateral load resisting structural elements 330A and 330B to which they are attached undergo lateral deformations.

The energy dissipating material 320 used is a high damping rubber or a high damping visco-elastic material or any other material capable of dissipating energy (either displacement dependent, or velocity dependent).

FIG. 4 discloses another example of a damping system 10 according to the invention and comprising a first set of four plates 410 connected as in FIG. 3 to a second set of five plates 412 by larger, rectangular shaped sections of energy dissipating material 420. Variations in the number of plates used, and the length, width, thickness and shape of the energy dissipating material can be used to tune the damping system to the particular application to maximize its damping effect. Furthermore, FIG. 4 discloses an anchorage system 414 at one end of the plates 412 for anchoring the damping system 10 to the first and second lateral load resisting structural elements 430A and 430B.

FIG. 5 discloses a configuration of the damping system 10 where the energy dissipating portion of the damper 510 is separately constructed and then connected to rigid extension elements 520, which, in turn are configured to be structurally engaged with the first and second lateral load resisting structural elements 530A and 530B at a later time, for example at a construction site. In the configuration shown, the plates are joined together in sets for coupling to the rigid extension elements.

Figure 6A:
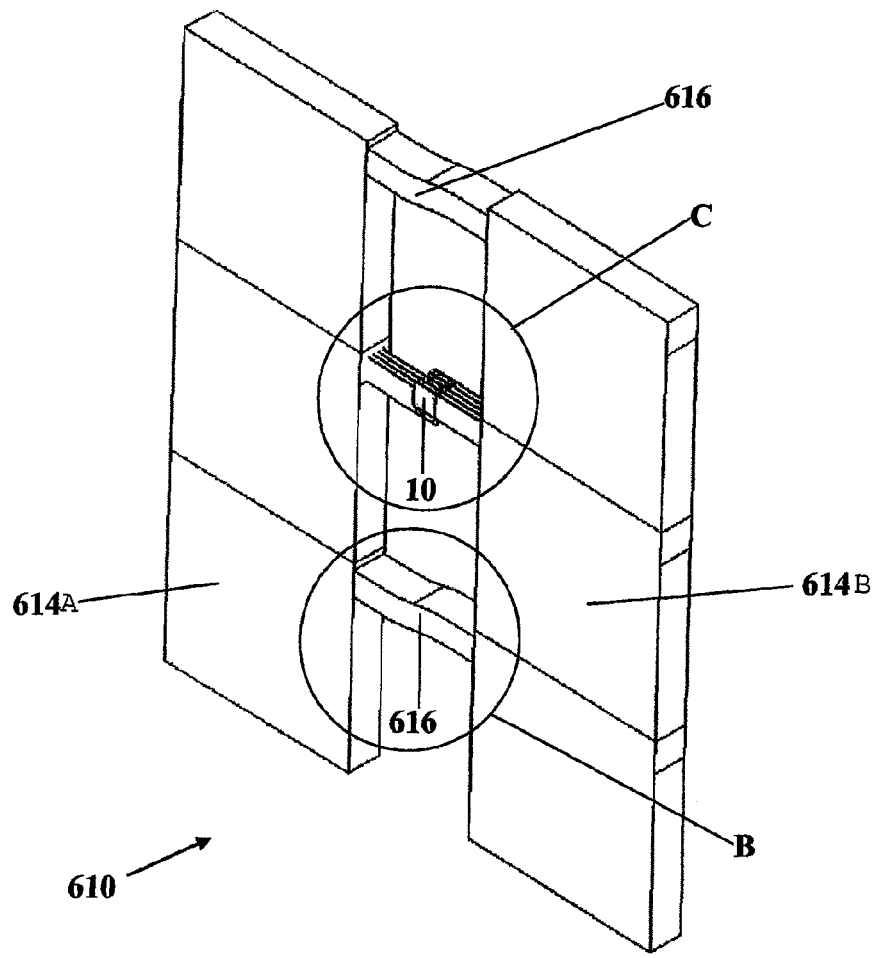
FIG. 6A is an orthogonal view of two shear walls undergoing deformation with the disclosed invention present coupled between the walls.
Figure 6B:
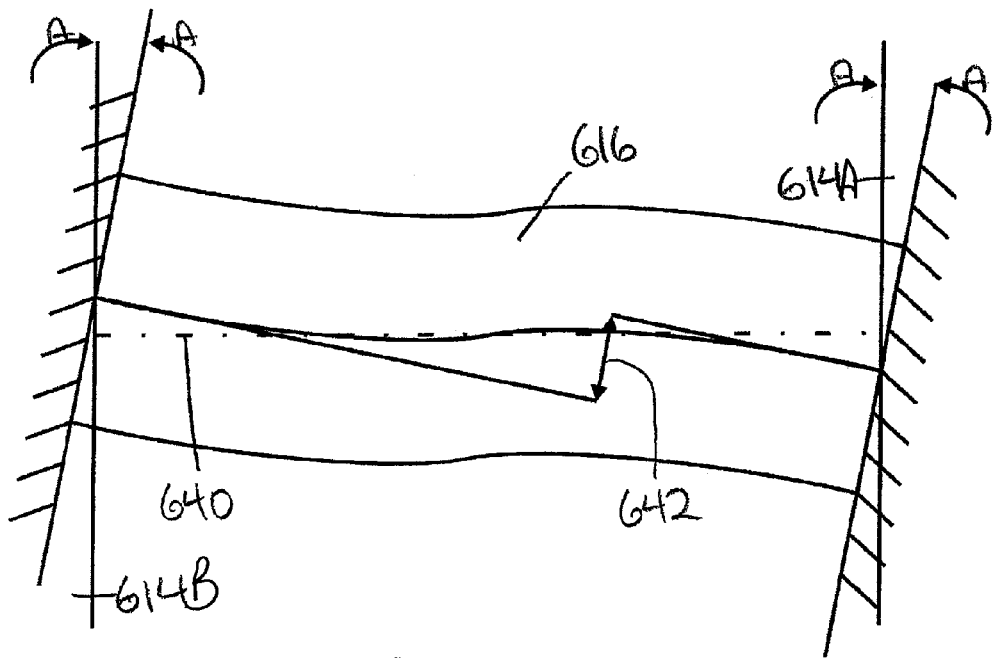
FIG. 6B is a close-up of the circled area B of FIG. 6A.
Figure 6C:
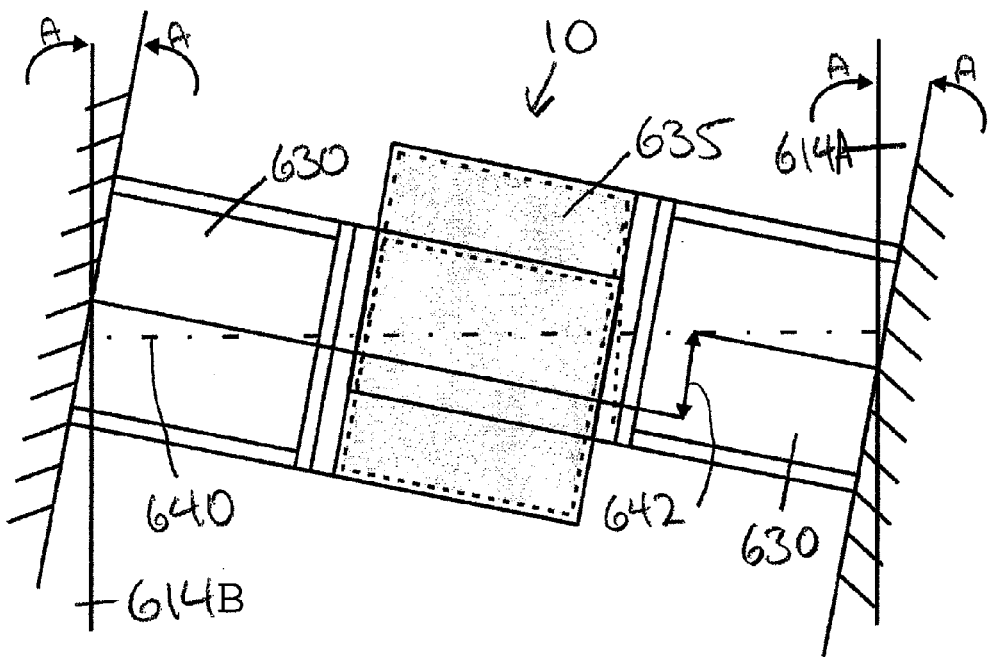
FIG. 6C is a close-up of the circled area C of FIG. 6A.

FIG. 6A discloses a structure 610 undergoing lateral deformation. The coupling beams 616 connecting the shear walls 614A and 614B are deformed, as well as the damping system 10. FIG. 6B shows a close-up of a coupling beam 616 under deformation. As the shear walls 614A and 614B shift, they undergo a rotation by an amount shown by arrows A-A, and the coupling beam 616 is deformed from the base chord 640 by a corresponding amount shown by arrow 642. The deformation of coupling beam 616 is a rotational effect arising from the lateral displacement of shear walls 614. FIG. 6C shows a close-up of damping system 10 under deformation in the same manner. It can be seen that the rigid extension elements 630A and 630B do not deform, but instead laterally displace, and deformation is restricted to the energy dissipating elements 635 (shown shaded). Thus, minimal rotational deformation takes place.

Preferred embodiments of the invention thus utilize the in-plane relative deformations, in both orthogonal directions, and in-place differential rotations, between two or more lateral load resisting structural elements, regardless of composition, to provide additional damping.

They provide a damping system that is relatively inexpensive, compared to current damping systems.

The preferred embodiments further provide a damping system capable of being installed without significant changes to the architectural and structural configuration of the building structure in which it is to be installed, and one that is easily constructed and provides a simple replacement for conventional damping systems.

While the embodiment of the invention described herein relates to buildings subjected to lateral loads such as wind loads, seismic loads, and blast loads, other useful applications of this invention, including, but not limited to other structures, will be apparent to those skilled in the art.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. For example, while the plates constituting the first and second sets have been described as made from steel, any material sufficiently rigid to provide the necessary structural integrity to the building and to follow the movement of the lateral load resisting elements such as walls or beams could be used, such as other metals and alloys, high strength resin reinforced composites and the like. Also, the energy dissipating material can be chosen from a wide variety of materials, such as natural or synthetic rubber (SBR, polybutadiene, polyisoprene, butyl, etc.), a choice which is within the skill of the art. It is intended the scope of the invention be limited not by this description but by the claims that follow.

What is claimed is:

1. A damping system for use in a structure, comprising:
   a structural element to replace a coupling beam in the structure, the structural element comprising:
   a) a first set of plates, said first set of plates having a first end embedded in a first lateral load-resisting structural element within said structure;
   b) a second set of plates, said second set of plates having a second end embedded in a second lateral load-resisting structural element within said structure, said second lateral load-resisting structural element being located substantially parallel to, and spaced horizontally from, said first lateral load-resisting structural element; and
   c) coupling means effective to couple the first set of plates to the second set of plates; said coupling means comprising an energy dissipating material;
   wherein said coupling means undergoes shear deformation when lateral loads are applied to the structure.

2. The damping system of claim 1 wherein each said set of plates comprises a plurality of substantially parallel, spaced-apart plates, the plates of said first set interdigitating with the plates of said second set.

3. The damping system of claim 1, wherein each plate in said first set of plates is additionally coupled to each other plate in said first set of plates and each plate in said second set of plates is additionally coupled to each other plate in said second set of plates.

4. The damping system of claim 2, wherein each plate in said first set of plates is additionally coupled to each other plate in said first set of plates and each plate in said second set of plates is additionally coupled to each other plate in said second set of plates.

5. The damping system of claim 1, wherein said first end includes a rigid extension element adapted for affixing to said first lateral load-resisting structural element.

6. The damping system of claim 1 wherein the structural element is sized substantially similar to the coupling means.

7. The damping system of claim 1, wherein the structural element is sized larger than the coupling means.

8. A method of increasing the damping in a structure, comprising:
   inserting at least one damping system between a first lateral load-resisting structural element and a second lateral load-resisting structural element, said second lateral load-resisting structural element being located substantially parallel to, and spaced horizontally from, said first lateral load-resisting structural element, and said damping system replacing a coupling beam otherwise used to connect the first lateral load-resisting structural element and the second lateral load-resisting structural element, wherein said damping system includes: a first set of plates, said first set of plates having a first end embedded in said first lateral load-resisting structural element; a second set of plates, said second set of plates having a second end embedded in said second lateral load-resisting structural element; and said first set of plates is coupled to said second set of plates by an energy dissipating material; wherein said energy dissipating material undergoes shear deformation when lateral loads are applied to said structure.

9. The method of claim 8, wherein said inserting step includes insertion of at least one damping system per floor of said structure.

10. The method of claim 8, wherein damper stiffness and damper energy dissipation capacity of said damping system is adjusted by changing the number of plates in said first set of plates and changing the number of plates in said second set of plates.

11. A structure with increased damping, comprising:
    a first lateral load-resisting structural element;
    a second lateral load-resisting structural element located substantially parallel to, and spaced horizontally from, the first lateral load-resisting structural element;
    at least one damping system located in between the first lateral load-resisting structural element and the second lateral load-resisting structural element, and replacing a coupling beam otherwise used to connect the first lateral load-resisting structural element and the second lateral load-resisting structural element, said damping system including:
- a first set of plates having a first end embedded in said first lateral load-resisting structural element within said structure;
- a second set of plates having a second end embedded in said second lateral load-resisting structural element within said structure,
- and coupling means effective to couple said first set of plates to said second set of plates, the coupling means comprising an energy dissipating material; wherein said coupling means undergoes shear deformation when lateral loads are applied to said structure.

12. The structure of claim 11, wherein said structure includes at least one said damping system per floor of said structure.

13. The structure of claim 11, wherein the first lateral load-resisting structural element is a column and the second lateral load-resisting structural element is a shear wall.

14. The structure of claim 11, wherein the first lateral load-resisting element is a first shear wall and the second lateral load-resisting element is a second shear wall.

15. The structure of claim 11, wherein the damping system is sized substantially similar to the coupling means.

16. The structure of claim 11, wherein the damping system is sized larger than the coupling means.

* * * * *